United States Patent [19]

Wideman et al.

[11] Patent Number: 5,037,956

[45] Date of Patent: Aug. 6, 1991

[54] PROCESS FOR THE PREPARATION OF THE HYDROXYDIPHENYLAMINE ESTER OF ROSIN ACID

[75] Inventors: Lawson G. Wideman, Tallmadge; Denise J. Keith, Akron, both of Ohio

[73] Assignee: The Goodyear Tire & Rubber Company, Akron, Ohio

[21] Appl. No.: 402,722

[22] Filed: Sep. 5, 1989

[51] Int. Cl.$^5$ .............................................. C08L 93/04
[52] U.S. Cl. .................................. 530/215; 530/218; 524/270
[58] Field of Search ................................. 530/215, 218

[56] References Cited

U.S. PATENT DOCUMENTS

| | | | |
|---|---|---|---|
| 1,979,671 | 11/1934 | Butts | 530/215 |
| 2,369,125 | 2/1945 | Anderson | 530/215 |
| 2,736,664 | 2/1956 | Bradley et al. | 530/215 |
| 4,287,270 | 10/1981 | Uhrig et al. | 530/215 |
| 4,324,710 | 4/1982 | Davis et al. | 524/76 |
| 4,419,470 | 12/1983 | Davis et al. | 524/76 |
| 4,758,379 | 7/1988 | Johnson, Jr. | 530/218 |
| 4,775,496 | 10/1988 | Wideman et al. | 530/221 |
| 4,946,879 | 8/1990 | Wideman et al. | 530/215 |

FOREIGN PATENT DOCUMENTS 60-174751 9/1985 Japan.

*Primary Examiner*—John Kight, III
*Assistant Examiner*—Dennis R. Daley
*Attorney, Agent, or Firm*—Bruce J. Hendricks

[57] ABSTRACT

The present invention relates to the preparation of the p-hydroxydiphenylamine ester of rosin acid. The process involves first reacting hydroquinone and aniline in the presence of a bentonite catalyst to form a reaction mixture containing p-hydroxydiphenylamine. To this reaction mixture is added rosin acid under esterification conditions to form the p-hydroxydiphenylamine ester.

21 Claims, No Drawings

PROCESS FOR THE PREPARATION OF THE HYDROXYDIPHENYLAMINE ESTER OF ROSIN ACID

BACKGROUND OF THE INVENTION

Rosin acid esters are described in U.S. Pat. No. 4,775,496. These rosin acid esters are described as being particularly useful as antidegradants in polymeric compositions. As described in this patent, the rosin acid ester may be formed by reacting the rosin acid and p-hydroxydiphenylamine in the presence of toluene sulfonic acid and m-xylene. The mixture is refluxed at a pot temperature of 205° C. for 24 hours. Unfortunately, this process suffers from the disadvantage of long reaction times. In addition, the upstream preparation of the p-hydroxydiphenylamine requires removal of the catalyst with isolation and purification of the p-hydroxydiphenylamine.

As mentioned above, hydroxydiphenylamine may be reacted with a rosin acid to produce an extremely useful additive for rubber Japanese Patent Application SHO 59-30388 relates to the manufacture of hydroxydiphenylamine by reacting a phenol with an aromatic amine in the presence of an ion exchanged stratified clay catalyst also known as bentonite clay.

SUMMARY OF THE INVENTION

The present invention relates to the preparation of a rosin acid ester comprising:

(a) reacting hydroquinone with aniline at a temperature of from about 180° C. to about 300° C. in the presence of a catalytic amount of bentonite clay to form a reaction mixture containing p-hydroxydiphenylamine; and (b) reacting said reaction mixture at a temperature of from about 230° C. to about 300° C. with rosin acid to form a rosin acid ester.

DETAILED DESCRIPTION OF THE INVENTION

The rosin acid esters which are prepared in accordance with the process of the present invention are represented by the following structural formulae:

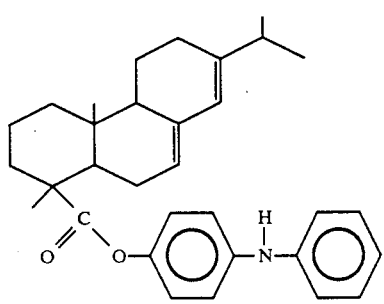

(I)

and

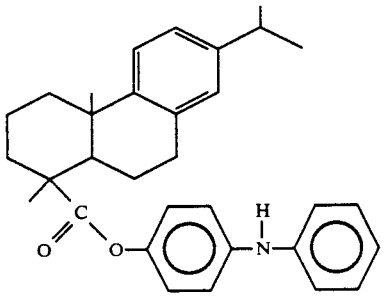

(II)

The rosin acid esters of formulae I and II are derived from rosin acid and a reaction mixture containing hydroxydiphenylamine. The reaction mixture containing the hydroxydiphenylamine is derived from reacting hydroquinone and aniline in the presence of a catalytic amount of bentonite clay. The mole ratio of hydroquinone to aniline may range from about 3:1 to about 1:3, with a range of from about 2:1 to about 1:2 being preferred and a range of from 1:1.5 to 1:1 being particularly preferred.

The reaction between the aniline and hydroquinone is generally carried out in the liquid phase. Optionally, the reaction is conducted in the presence of a solvent. Examples of solvents which may be used include benzene, toluene, xylene, ethylbenzene, cumene, chlorobenzene and dichlorobenzene.

The reaction between the hydroquinone and aniline may be conducted over a variety of temperatures. Generally, the reaction temperature may range from about 180° C. to about 300° C. Preferably, the reaction temperature ranges from about 190° C. to about 260° C.

The reaction between the aniline and hydroquinone may be conducted over a range of pressures. Generally, the pressure of the reaction will range from below atmospheric (about 2.5 cm of Hg or −15 psig) to about 7600 cm of Hg or 100 psig. Preferably, the pressure of the reaction ranges from about atmospheric to about 3800 cm of Hg or 50 psig.

The catalyst for use in the present invention is bentonite, also known as wilkenite. Bentonite is a colloidal native hydrated aluminum silicate (clay) found in the Midwest of the United States and Canada. Bentonite consists primarily of montmorillonite, $Al_2O_3.4SiO_2.H_2O$. A bentonite that is particularly suited for use in the present invention is commercially available from Southern Clay Products, an ECCA Company of Gonzales, Tex. and sold under the product designation Bentolite L. According to the product literature, the typical chemical analysis of Bentolite L is 71.7% $SiO_2$, 15.7% $Al_2O_3$, 3.6% $MgO$, 1.7% $CaO$, 0.3% $Fe_2O_3$, 0.3% $TiO_2$, 0.2% $Na_2O$ and 0.16% $K_2O$. The bentonite clay that is used in the present invention is considered to be a neutral catalyst vs. the known acid catalyst. While the pH of the catalyst may vary, it generally varies between 6 and 8, with a range of from 6.5 to 7.5 being preferred and 7.0 being particularly preferred. The pH for Bentolite L is 7.0. The amount of bentonite clay may vary, however, it is generally sufficient to catalyze the reaction between the aniline and hydroquinone and the following esterification reaction. The total amount of bentonite clay for both steps of the process of the present invention may range from about 3.0 parts by weight to about 30 parts per weight per 100 parts by weight of total reactants (aniline, hydroquinone and rosin acid).

The amount of bentonite clay is preferably from about 10 to about 15 parts per weight of total reactants. The amount of bentonite clay for the reaction between the aniline and hydroquinone may range from about 7 to about 30 parts by weight per 100 parts of reactants (aniline and hydroquinone) with a range of from about 10 to 15 parts being preferred.

One aspect of the present invention is that the whole preparation may be conducted in a one-pot procedure. For example, once the reaction between the hydroquinone and aniline is complete, one does not need to filter the reaction mixture to remove the catalyst residue. In addition, the crude hydroxydiphenylamine that is in the reaction mixture does not have to be distilled, crystallized or extracted. The advantages of a one pot procedure include minimizing material losses, labor savings and a reduction in the amount of exposure to the reactants.

To this reaction mixture is charged the rosin acids. The rosin acids which can be used in the practice of the present invention are monocarboxylic acids having the typical molecular formula $C_{20}H_{30}O_2$. Rosin acids are derived from rosin which is a solid resinous material that occurs naturally in pine trees. There are three major sources of rosin: (1) gum rosin from the oleoresin extrudate of the living tree, (2) wood rosin from the oleoresin contained in the aged stumps, and (3) tall oil rosin from the waste liquor recovered as a by-product in the Kraft paper industry. Rosins derived from both oleoresin and aged stump wood are composed of approximately 90% rosin acids and 10% nonacidic components.

Examples of the rosin acids which may be used include abietic, levopimaric, neoabietic, palustric, dehydroabietic, tetrahydroabietic, pimaric, isopimaric, Δ-isopimaric, elliotinoic and sandaracopimaric. Over the years nomenclature of individual acids has changed. IUPAC nomenclature names rosin acids as derivatives of abietane. The two major rosin acid components are abietic acid having the following structural formula:

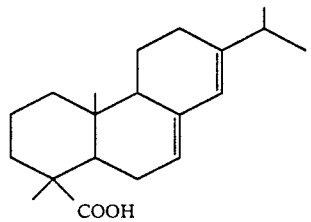

and dehydroabietic acid, having the structural formula:

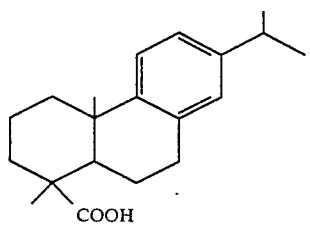

The esterification reaction between the rosin acid and the p-hydroxydiphenylamine contained in the reaction mixture is conducted at a temperature ranging from about 200° C. to about 300° C. Preferably, the reaction temperature ranges from about 240° C. to about 280° C. The most preferred temperature is 260° C.

The esterification reaction may be conducted at a variety of pressures. Generally speaking, the reaction may be conducted at a reaction pressure ranging from about 2.5 cm of Hg or −15 psig to about 7600 cm of Hg or 100 psig, with a range of from about 76 cm of Hg or 0 psig to about 1140 cm of Hg or 15 psig being preferred.

The amount of bentonite catalyst should be sufficient to drive the esterification reaction. As mentioned above, the total amount of bentonite catalyst should range from about 3.0 parts to about 30 parts per 100 parts of total reactants, (aniline, hydroquinone and rosin acid). As to the esterification reaction, the amount of bentonite clay may range from about 7 to about 30 parts by weight per 100 parts of the reactants (crude p-hydroxydiphenylamine and rosin acid), with a range of from about 10 to 15 parts being preferred. In one embodiment, one may add an excess amount in the hydroxydiphenylamine forming reaction with the residue being sufficient for the esterification reaction. In accordance with another embodiment, supplemental amounts of bentonite clay catalyst may be added for the esterification reaction.

After the esterification reaction is complete, one need only filter the product from the bentonite clay catalyst residue and dry the product by conventional means. No neutralization of the catalyst is needed since the bentonite clay catalyst is relatively neutral.

While additional esterification catalysts are not needed, one may optionally use such known catalysts such as sulfuric acid, hydrochloric acid and toluenesulfonic acid. Depending on the acid catalysts used, one may need to neutralize the catalyst prior to isolation of the product by filtration. For example, when the acid catalyst is sulfuric or hydrochloric acid, preferably the acid catalyst is neutralized.

The reaction vessel in which the present invention may be carried out should be equipped with a heating means, agitation means, an overhead with condenser for removal of by-products, and a thermometer. In addition, the reactor should be equipped to maintain an inert gas atmosphere, i.e., nitrogen to avoid forming undesirable side reactions. The lining of the reaction vessel does not appear to be critical and, therefore, stainless steel or glass-lined reactors may be used.

The present process may be conducted in a number of variations without departing from the scope of the invention. For example, the processing may be conducted in a batchwise, semi-continuous or continuous manner.

The present invention is further illustrated by the following examples which are not intended to be limiting.

Example 1

A 2-liter round bottom flask was charged with 110 grams (1 mole) of hydroquinone, 102 grams (1.1 mole) of aniline and 20 grams of Bentolite L clay and heated to 250° C. for about 45 minutes under a nitrogen atmosphere to remove a mole of water. The flask was cooled to 100° C. and subjected to a reduced pressure of 2.5 cm of Hg for about 1/2 hour to remove excess aniline. NMR analysis of a sample of the reaction product showed the formation of crude hydroxydiphenylamine. The flask was then charged with 300 grams of tall oil rosin acid (1.0 mole), 28 grams of Bentolite L clay and 70 mls of m-xylene. The reaction mixture was heated under a nitrogen atmosphere and water removed via a Dean-Stark trap. The pot temperature was adjusted to 260° C. by adjusting the amount of m-xylene present. After 17 hours, 26 mls of water was removed. The contents of the flask were dissolved in approximately 1 liter of toluene (excess), filtered and vacuum dried at about 170° C. Analysis of the sample by IR and HPLC indicated the formation of crude hydroxydiphenylamine ester of rosin acid.

Example 2

A 2-liter round bottom flask equipped with a Dean-Stark trap and thermometer was charged with 110 g (1.0 mole) of hydroquinone, 102 g (1.1 mole) aniline and 20 g Bentolite L clay and heated to 250° C. for about 45 minutes under nitrogen. Approximately, one mole of water was removed. NMR analysis of a sample of the reaction product showed the formation of crude hydroxydiphenylamine. To the reaction mixture was then charged 300 g of tall oil rosin acid (1.0 mole), 22 g of toluene sulfonic acid and 134 ml of m-xylene. The flask was heated to 205-240° C. and about 21 ml of water were removed in 27 hours. The flask was treated with an excess of toluene, heated and filtered to give the crude hydroxydiphenylamine ester of rosin acid as evidenced by infrared spectroscopic studies.

While certain representative embodiments and details have been shown for the purpose of illustrating the invention, it will be apparent to those skilled in the art that various changes and modifications may be made therein without departing from the scope of the invention.

What is claimed is:

1. A process for the preparation of a rosin acid ester comprising:
   (a) reacting hydroquinone with aniline at a temperature of from about 180° C. to about 300° C. in the presence of a catalytic amount of bentonite clay to form a reaction mixture containing p-hydroxydiphenylamine; and
   (b) reacting said reaction mixture at a temperature of from about 200° C. to about 300° C. with rosin acid to form a rosin acid ester.

2. The process of claim 1 wherein the reaction between the hydroquinone and aniline is at a temperature of from 190° C. to 260° C.

3. The process of claim 1 wherein the reaction between the hydroquinone and aniline is from 2.5 cm of Hg to about 7600 cm of Hg.

4. The process of claim 2 wherein the reaction between the hydroquinone and aniline may range from atmospheric to 3800 cm of Hg.

5. The process of claim 1 wherein the mole ratio of hydroquinone to aniline ranges from about 3:1 to about 1:3.

6. The process of claim 1 wherein the total amount of bentonite clay ranges from about 3 parts to about 30 parts per 100 parts of aniline, hydroquinone and rosin acid.

7. The process of claim 6 wherein the amount of bentonite clay is from about 10 to 15 parts by weight per 100 parts of aniline, hydroquinone and rosin acid.

8. The process of claim 1 wherein an acid catalyst selected from the group consisting of sulfuric acid, hydrochloric acid and toluenesulfonic acid is present.

9. The process of claim 1 wherein the reaction between said reaction mixture and rosin acid is conducted at a temperature from about 240° C. to about 280° C.

10. The process of claim 1 wherein the reaction between the rosin acid and the reaction mixture containing p-hydroxydiphenylamine is conducted at a pressure ranging from about 2.5 cm of Hg to about 7600 cm of Hg.

11. The process of claim 10 wherein the pressure ranges from about 76 cm of Hg to about 1140 cm of Hg.

12. The process of claim 1 wherein the pH of the bentonite clay ranges from about 6 to about 8.

13. The process of claim 12 wherein the pH ranges from about 6.5 to about 7.5.

14. The process of claim 13 wherein the pH is about 7.0.

15. The process of claim 1 wherein the rosin acid is of the structural formulae:

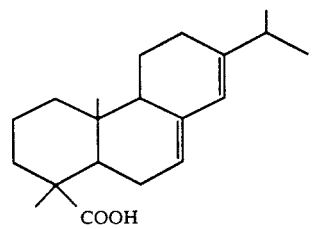

16. The process of claim 1 wherein the rosin acid is of the structural formulae:

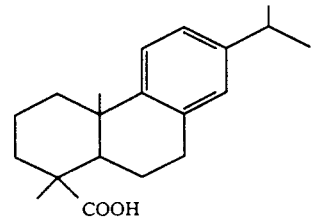

17. The process of claim 1 wherein the rosin acid ester is of the structural formulae:

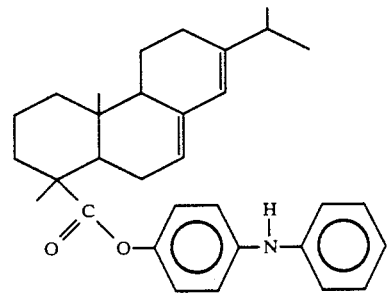

18. The process of claim 1 wherein the rosin acid ester is of the structural formulae:

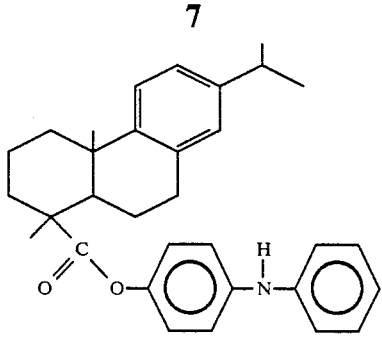
19. The process of claim 1 wherein the process is conducted in a batchwise, semi-continuous or continuous manner.
20. The process of claim 1 wherein the process is conducted in a batchwise manner.
21. The process of claim 1 wherein the process is conducted in a continuous manner.
* * * * *